Dec. 19, 1967 NOBUTOSHI KIHARA 3,359,365

RECORDING AND REPRODUCING SYSTEM

Filed July 27, 1965 7 Sheets-Sheet 1

Inventor
Nobutoshi Kihara

Dec. 19, 1967 NOBUTOSHI KIHARA 3,359,365

RECORDING AND REPRODUCING SYSTEM

Filed July 27, 1965 7 Sheets-Sheet 2

Inventor
Nobutoshi Kihara

Inventor
Nobutoshi Kihara

Dec. 19, 1967 NOBUTOSHI KIHARA 3,359,365

RECORDING AND REPRODUCING SYSTEM

Filed July 27, 1965 7 Sheets-Sheet 4

Inventor
Nobutoshi Kihara

Inventor
Nobutoshi Kihara

Inventor
Nobutoshi Kihara

Inventor
Nobutoshi Kihara

United States Patent Office 3,359,365
Patented Dec. 19, 1967

3,359,365
RECORDING AND REPRODUCING SYSTEM
Nobutoshi Kihara, Tokyo, Japan, assignor to Sony Corporation, Tokyo, Japan, a corporation of Japan
Filed July 27, 1965, Ser. No. 475,070
Claims priority, application Japan, Aug. 1, 1964, 39/44,082
12 Claims. (Cl. 178—5.4)

ABSTRACT OF THE DISCLOSURE

A system for recording and reproducing video signals in which only every other field or frame of the video signal is recorded and on play-back the reproducing head scans each field or frame twice to obtain a series of signals equal in number to the series of signals originally present.

This invention relates generally to recording and reproducing systems and methods and more particularly to such a system with which it is desired to record and/or reproduce visual images on a magnetic tape, the information being stored on the magnetic tape on parallel record tracks which extend obliquely across the tape.

In systems presently being used to record and/or reproduce visual images on a magnetic tape each field or frame of the video signal is recorded along a track on the magnetic medium and then is in some manner reproduced. In such prior art systems, however, the recording time for one reel of tape is limited due to the large quantity of tape that must be used, and consequently with such prior art systems an extended series of video signals cannot be recorded for a long period of time without interruption.

The present invention is based upon the fact that there is no appreciable difference in the information content of adjacent or slightly spaced fields or frames of a television signal. Accordingly, even if the video signal corresponding to a certain field or frame of a television signal is replaced, for example, by an adjacent or slightly spaced field or frame, the variation or change cannot be recognized by the naked eye. In addition, in the case of color video signals, it is possible to have a time lag between the field or frame of luminance signals and those of chrominance signals without affecting the reproduced color picture which is produced by combining both signals.

Briefly stated the present invention is directed to the provision of a recording and/or reproducing system in which spaced video signals of only specified fields or frames of a continuous train of fields or frames are recorded on a magnetic tape in the form of skew magnetic trucks, and during reproduction each of the tracks is reproduced a plurality of times to obtain a series of signals. For example, in one embodiment of the invention only every other field or frame of a video signal is recorded, i.e. only half the fields or frames of the video signal are recorded, and then during reproduction each of the tracks corresponding to a field or frame is reproduced twice to thereby obtain a series of signals equal in number to the series of signals originally present.

In view of the foregoing it is the primary object of the present invention to provide a recording and/or reproducing system and method which eliminates predetermined fields or frames of a television signal during recording, each recorded field or frame being reproduced a plurality of times during reproduction such that the number of fields or frames reproduced during reproduction is equal to the number of fields or frames present in the original signal.

Another object of the present invention is to provide a magnetic recording and/or reproducing system in which the amount of magnetic tape used during recording is reduced in accordance with the percentage reduction of the fields or frames recorded, and in which the recording time for a specified magnetic tape is increased by the factor by which the fields or frames have been eliminated during recording.

A further object of the present invention is to provide a recording and/or reproducing system for colored television signals.

These and further objects, features and advantages of the present invention will appear from a reading of the following detailed description of several embodiments of the invention to be read in conjunction with the accompanying drawings in which similar components in the several views are identified by the same reference numeral.

In the drawings:

FIGURE 19 is a schematic diagram similar to

Figure 19:
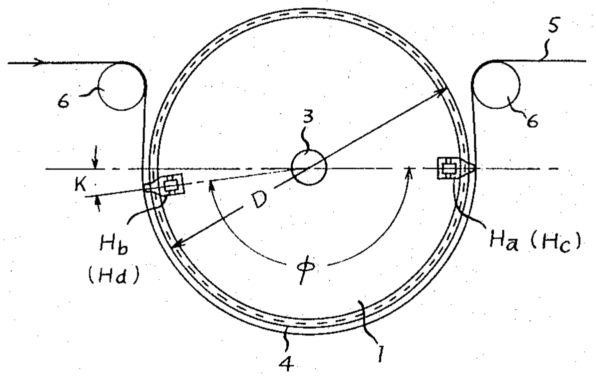
Figure 20:
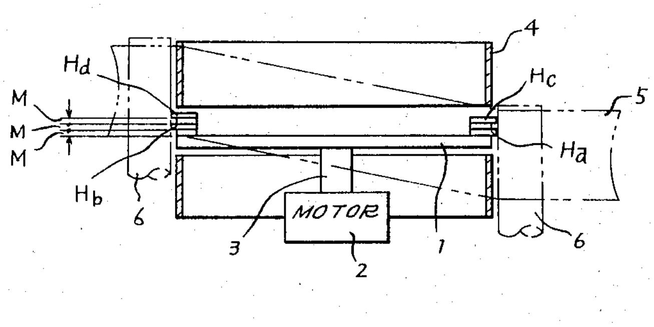

FIGURES 1, 6, 10 and 14 and illustrating another example of a rotary magnetic head assembly in accordance with the present invention; and FIGURE 20 is a side view of the rotary magnetic head assembly illustrated in FIGURE 19.

Figure 1:
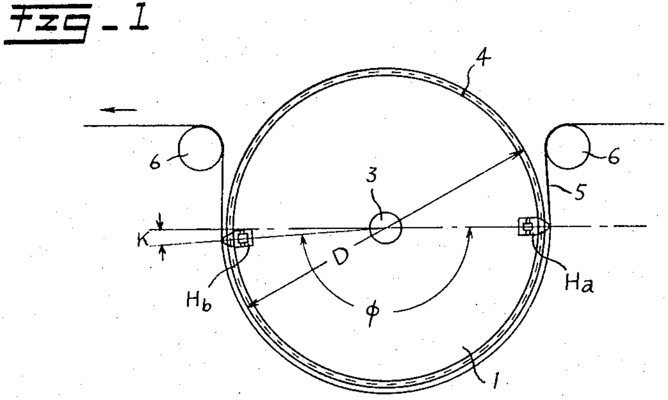
FIGURE 1 is a schematic plan view illustrating one example of a rotary magnetic head assembly for use in a magnetic recording and/or reproducing system according to the present invention.
Figure 2:
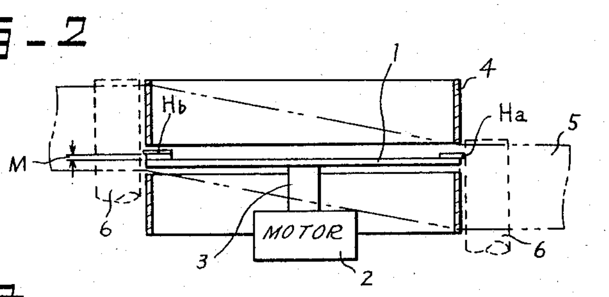
FIGURE 2 is a side view of the rotary magnetic head assembly illustrated in FIGURE 1.

Referring now to the drawings and particularly to FIGURES 1 and 2 there is illustrated a cylindrical disc 1 mounted on a rotary shaft 3, the shaft 3 and consequently the disc 1 being rotated by a motor 2. The periphery of the disc 1 has attached thereto at spaced intervals two magnetic heads H*a* and H*b*. The heads H*a* and H*b* are spaced apart a predetermined angular distance $\phi$ and a predetermined axial distance M as illustrated in FIGURES 1 and 2. The magnetic tape 5 is directed around a cylindrical guide member 4 by means of guide rollers 6 which are positioned obliquely to the direction of travel of the tape. In the embodiment illustrated in FIGURES 1 and 2 the magnetic tape 5 travels around a 180° portion of the guide member 4 and during said travel around the guide member 4 contacts the magnetic heads H*a* and H*b*.

Figure 3:
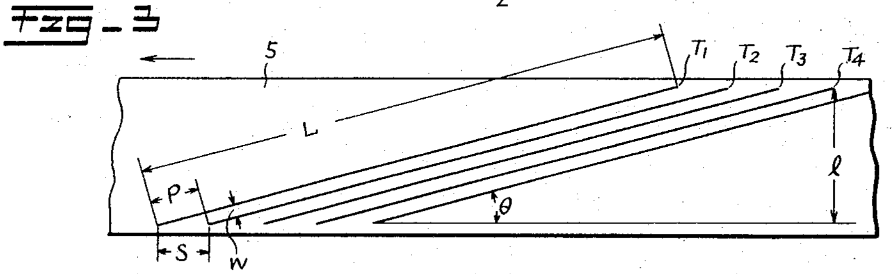
FIGURE 3 illustrates the magnetic tracks formed on a magnetic tape by the rotary magnetic head illustrated in FIGURE 1, the magnetic tracks being enlarged many times for purposes of illustration.

With the apparatus illustrated in FIGURES 1 and 2 video signals consisting of one frame with two fields are recorded on the magnetic tape 5 by the magnetic head H*a*, the recording being in the form of parallel skew magnetic tracks $T_1$, $T_2$, $T_3$, etc., as shown in FIGURE 3. The signals from only odd number fields can be recorded on each of the tracks $T_1$, $T_2$, $T_3$, etc., by properly adjusting and selecting the following variables.

Q=revolutions per minute of the magnetic heads H*a* and H*b*.
$\phi$=angular distance between the heads H*a* and H*b*.
$D$=diameter of tape guide member 4.
$l$=effective width of the tape 5.
$V$=speed of the tape 5.

Since the rotary magnetic head H*a* comes into contact with the magnetic tape 5 at every half cycle of revolution and the duration of this contact corresponds to that of approximately one field, the video signals of fields such as the first, second, third, etc., as illustrated in FIGURE 5*a*, are selectively recorded in such a manner that only the odd number fields such as the first, third, fifth, etc., are recorded on the magnetic tape 5, as illustrated in FIGURE 5*b* to thereby form the tracks $T_1$, $T_2$, $T_3$, etc. Thus, by properly selecting and adjusting the variables referred to above only every other field is recorded. A comparison of FIGURES 5*a* and 5*b* illustrates that the odd number fields have been recorded and the even number fields have been eliminated. If desired the odd number fields can be eliminated and the even number fields recorded.

During reproduction the magnetic heads H*a* and H*b* scan the magnetic tracks $T_1$, $T_2$, $T_3$, etc., on the magnetic tape 5. This registration is accomplished by properly selecting the distance M between the heads H*a* and H*b* as illustrated in FIGURE 2. Therefore, during reproduction the magnetic head H*a* scans the track $T_1$ to thereby reproduce the video signal of the first field, and then the other magnetic head H*b* scans the same track $T_1$, to thereby reproduce the video signal of the first field again. As a result of this the entire reproduced composite signal is as illustrated in FIGURE 5*d*, i.e. two first frames, two third frames, two fifth frames, etc. In FIGURE 5*b*, the signal reproduced by head H*a* is illustrated and FIGURE 5*c* illustrates the signal reproduced by head H*b*. These two signals are combined to form the composite signal illustrated in FIGURE 5*d*.

It can therefore be seen that with the apparatus illustrated in FIGURE 1 alternate frames of the video signal only are recorded, the intermediate frames being eliminated. During reproduction the frames recorded are reproduced twice in order to obtain a video signal equal in duration to the original video signal. The design criteria for the rotary magnetic head assembly illustrated in FIGURES 1 and 2 is as follows:

$$Q=F/n$$

$$\phi=\frac{360^\circ}{n}\pm K^\circ$$

$$M=W/n$$

$$K^\circ=\frac{P}{n}\cdot\frac{360}{\pi D}$$

$$W=P\tan\theta$$

Where F equals the frequency of the field or frame to be recorded on each magnetic track $n$ equals the number of magnetic heads, W equals the distance between adjacent tracks such as $T_1$, $T_2$, P equals the distance between the starting point of adjacent tracks and D equals the diameter of tape guide 4. The variables K and M are the requirements for having the magnetic heads scan the same magnetic tracks during reproducing as during recording. The various variables are illustrated in FIGURES 1, 2 and 3. In a typical device for example $n=2$, $F=60$ c./s., $\phi=170°$, $M=0.6$ mm. and $D=80$ mm.

Figure 4:
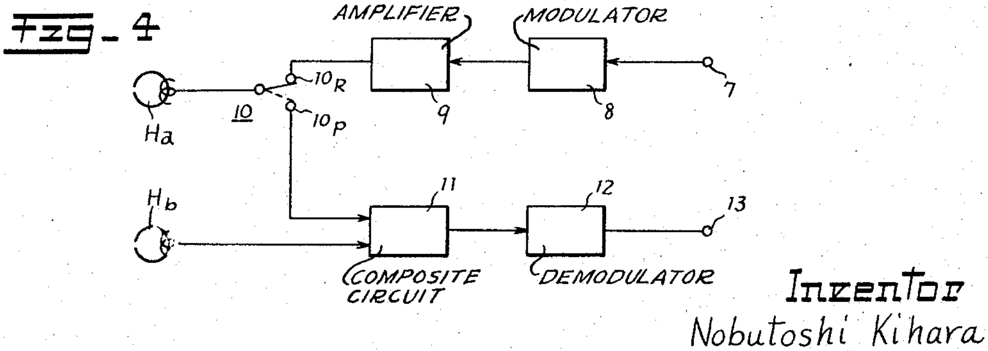
FIGURE 4 is a block diagram illustrating the electrical system for the operation of the apparatus of the present invention.
Figure 5:
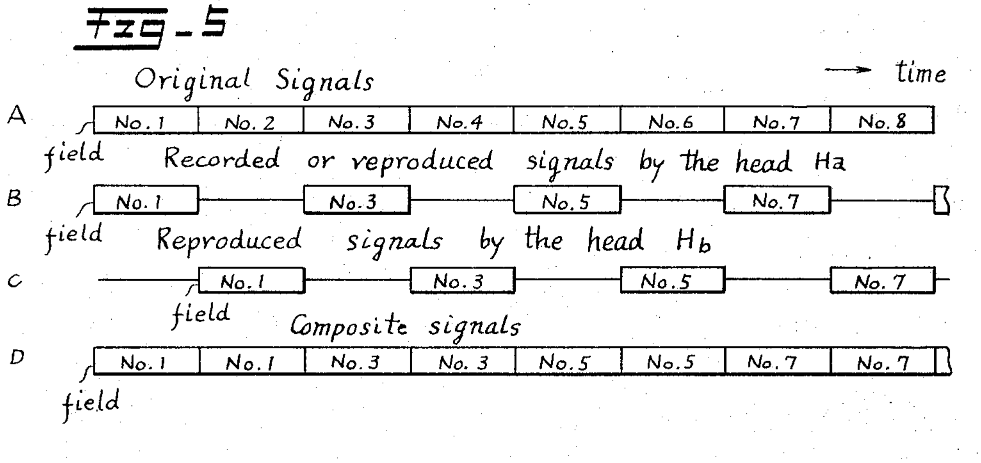
FIGURE 5 illustrates in block form various video signal arrangements that are present in the system illustrated in FIGURE 4.

In FIGURE 4 there is illustrated the block diagram for the electrical circuit to be utilized with the apparatus illustrated in FIGURES 1 and 2. During recording the video signal emanating from a video signal source 7 is applied to a frequency or phase modulator 8 in order to obtain the usual modulated signal. The modulated signal is then applied to the magnetic head H*a* through the amplifier 9 and the contact 10R of a switch 10. When it is desired to reproduce the recorded signal the reproduced output of the magnetic head H*a* is applied through contact 10P of the switch 10 to a composite circuit 11. The signal from the head H*b* is also applied to the composite circuit 11. The outputs from the heads H*a* and H*b* are therefore mixed by the composite circuit 11 and both output signals are then applied to a demodulating circuit 12 from which the desired reproduced output is delivered to a terminal 13. With the apparatus illustrated in FIGURES 1 and 2, the video signals are applied only to the magnetic head H*a* during recording and not to the magnetic head H*b*. As a result the video signals of only one field are recorded on the magnetic tape 5 by the magnetic head H*a* to thereby form the magnetic tracks $T_1$, $T_2$, $H_3$, etc. Thus, only one of every two fields of the video signal is recorded as illustrated in FIGURES 4 and 5. During reproducing the magnetic tracks $T_1$, $T_2$, $T_3$ are successively scanned twice, once each by the magnetic heads H*a* and H*b*. Therefore, the video signals of only every other field are recorded and therefore the amount of tape used is reduced by one half.

The apparatus illustrated in FIGURES 1 and 2 has been described with reference to the recording of ordinary two-field-one-frame interlaced video signals while forming one field track every two fields. It is to be understood, however, that the invention is equally applicable to the case where video signals are recorded while forming one frame track every two frames.

Figure 6:
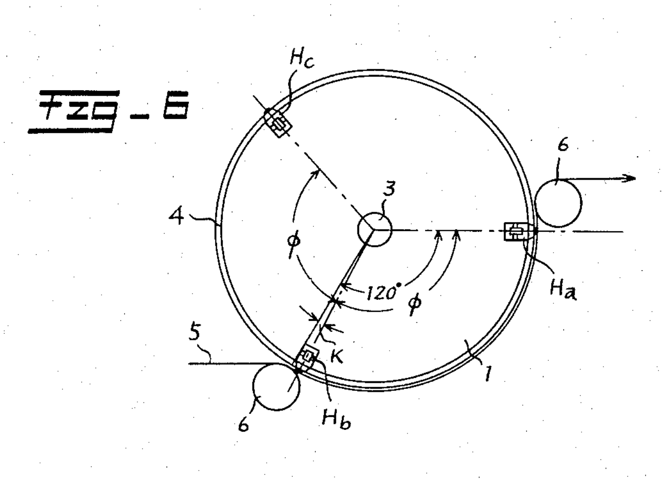
FIGURE 6 is a schematic diagram similar to FIGURE 1 but illustrating another example of a rotary magnetic head assembly.
Figure 7:
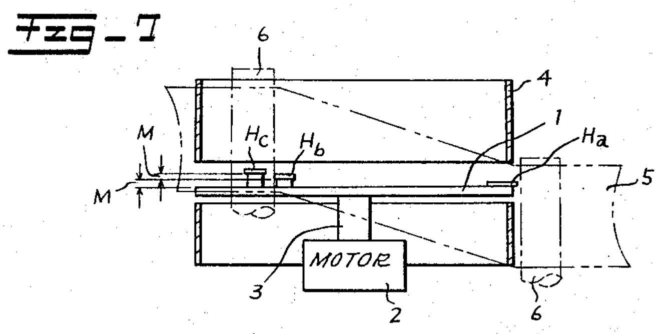
FIGURE 7 is a side view of the rotary magnetic head assembly illustrated in FIGURE 6.
Figure 8:
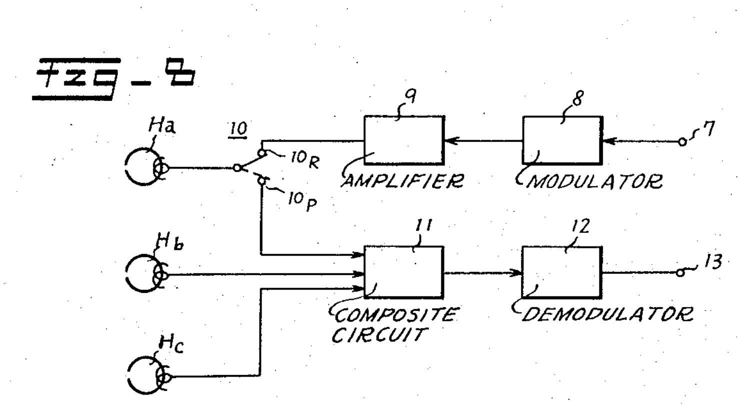
FIGURE 8 is a block diagram illustrating the electrical system used with the rotary magnetic head assembly illustrated in FIGURES 6 and 7.

If it is desired three magnetic heads H*a*, H*b* and H*c* may be utilized, such that video signals can be recorded by forming a track for only one frame out of every three frames. A rotary magnetic head assembly for accomplishing this is illustrated in FIGURES 6 and 7, while the circuit connections are illustrated in FIGURE 8*b*. The same reference numerals are used as those in connection with FIGURES 1, 2 and 4, where the components are the same.

Figure 9:
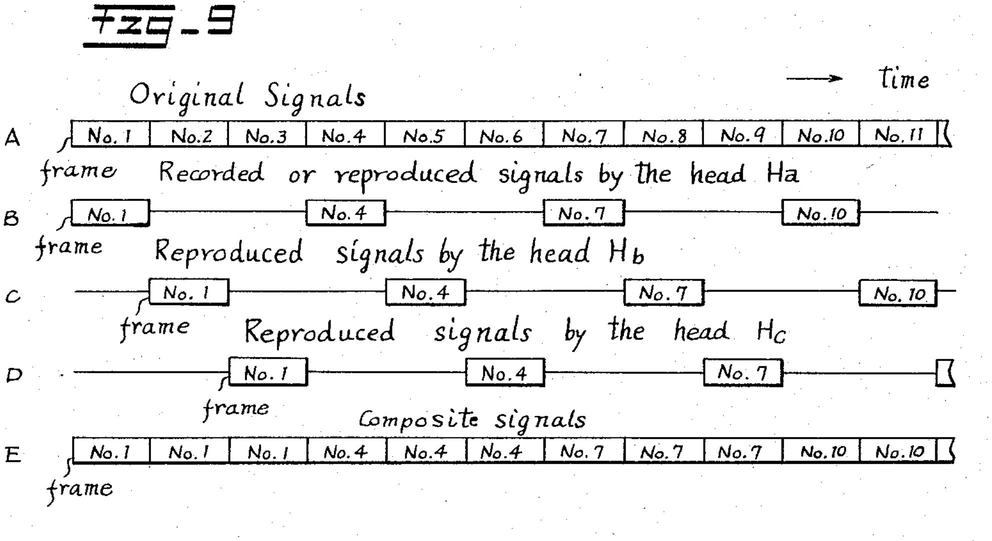
FIGURE 9 is similar to FIGURE 5 and illustrates various video signal arrangements in block form for use in the system illustrated in FIGURE 8.

The original television signals are illustrated in FIGURE 9*a*, and these are sampled every third frame and recorded by the magnetic head H*a* in order to obtain the recorded video signal illustrated in FIGURE 9*b*. During reproduction each frame is reproduced three times, once each by the magnetic heads H*a*, H*b* and H*c*, the signal reproduced by head H*a* being illustrated in FIGURE 9*b*, the signal reproduced by head H*b* being illustrated in FIGURE 9*c*, and the signal being reproduced by head H*c* being illustrated in FIGURE 9*d*. The composite reproduced video signal is illustrated in FIGURE 9*e*. As illustrated in this figure the composite video signal obtained by combining the signals from heads H*a*, H*b* and H*c* consists of every third frame being reproduced three times.

Figure 10:
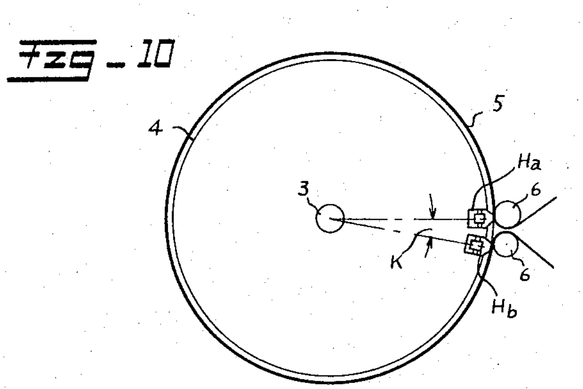
FIGURE 10 is a plan view similar to FIGURES 1 and 6 and illustrating still another example of a rotary magnetic head assembly in accordance with the present invention.
Figures 11, 12:
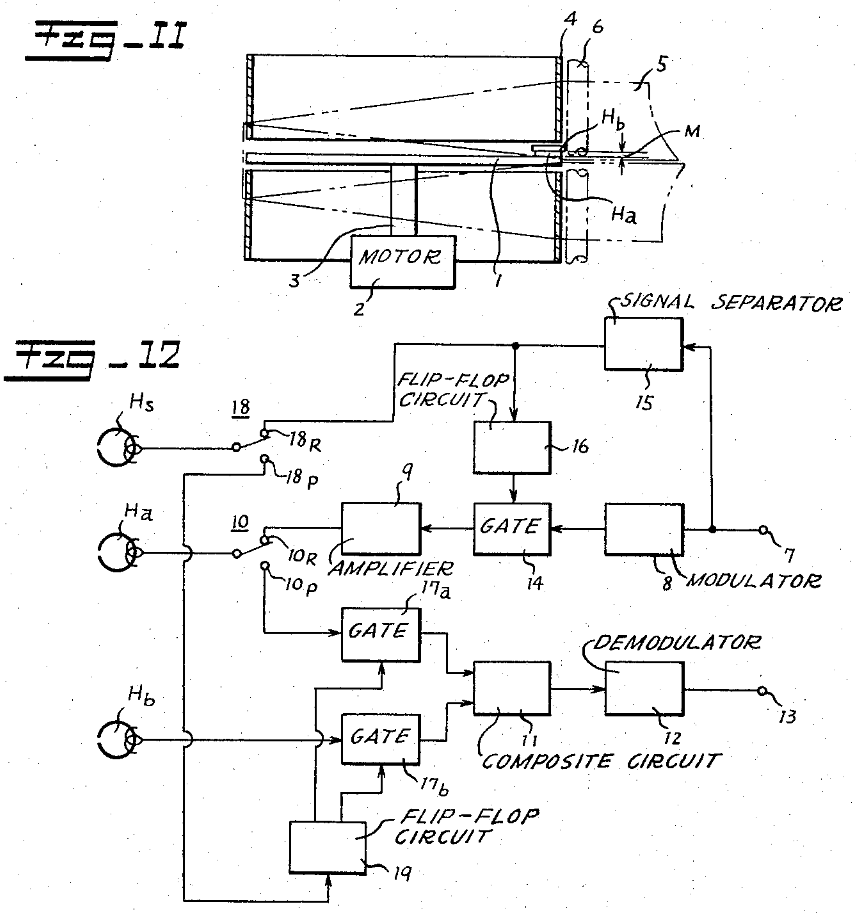
FIGURE 11 is a side view of the rotary magnetic head assembly illustrated in FIGURE 10.
FIGURE 12 is a block diagram illustrating the electrical system for use with the rotary magnetic head assembly illustrated in FIGURES 10 and 11.

In FIGURES 10 and 11 there is illustrated another modified form of a rotary magnetic head assembly in accordance with the present invention. As illustrated in FIGURES 10 and 11 two magnetic heads H*a* and H*b* are spaced apart an angular distance $K^0$ and at an axial distance M. The magnetic tape 5 is helically wrapped about the entire circumference of the guide member 4 such that the magnetic tape covers an angular range of approximately 360°. The circuit connections for this embodiment is illustrated in FIGURE 12.

As illustrated in FIGURE 12 the video signal emanating from the source 7 is connected to the magnetic head H*a* through a modulator 8, a gate circuit 14, an amplifier 9 and the contact 10R of a switch 10. The gate circuit 14 is adapted to be switched on and off by a flip-flop circuit 16 which is connected to a vertical synchronizing signal separating circuit 15. The vertical synchronizing pulses obtained from the vertical synchronizing signal separating circuit 15 are also applied to a magnetic head H*s* through a contact 18R of a switch 18. The magnetic head H*s* contacts, for example, the marginal portion of the tape 5.

During reproducing the output from the magnetic head H*a* is obtained at the output terminal 13 through the contact 10P of the switch 10, a gate circuit 17*a*, a composite circuit 11 and a demodulating circuit 12. The output from the magnetic head H*b* is also applied to the composite circuit 11 through a gate circuit 17*b*. The gate circuits 17*a* and 17*b* are controlled by the output pulse of a flip-flop circuit 19 to which is applied the output of the head H*s*.

Figure 13:
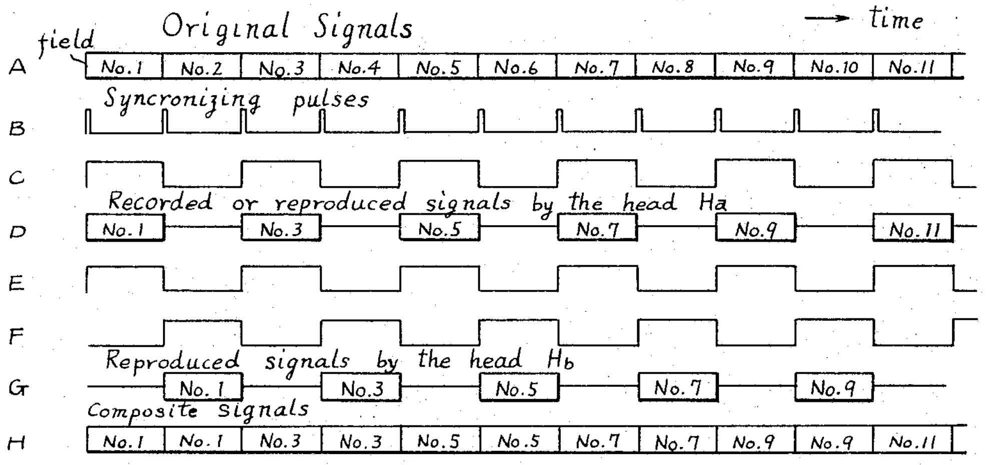
FIGURE 13 illustrates various video signal arrangements for explaining the operation of the system illustrated in FIGURE 12.

In FIGURE 13*a* there is illustrated the original video signal present at the terminal 7 which consists of first, second, third, fourth, fifth, sixth . . . and *n*th fields. The magnetic head H*a* is so positioned that one revolution thereof corresponds to the scanning time for one field. In FIGURE 13*b* there is illustrated the vertical synchronizing pulses of the vertical synchronizing signal separating circuit 15 and FIGURE 13*c* shows the output of the flip-flop circuit 16 in the form of rectangular wave pulses. As a result the gate circuit 14 is altered to the off state every two fields (every other field) and the video signal is cut off every revolution made by the head H*a*. Accordingly, for example, ultimate fields such as the odd numbered fields first, third, fifth and so on, are recorded on the tape 5 while the alternate even numbered fields such as second, fourth, sixth, etc., are not recorded.

During reproduction a reproduced video signal of one field is obtained by the magnetic head H*a* every two fields as illustrated in FIGURE 13*d*, and the same video signal of one field is also reproduced by the magnetic head H*b* every two fields as illustrated in FIGURE 13*g*. As a result a series of reproduced signals is produced in the order of first first, third third, fifth fifth, etc., as illustrated in FIGURE 13*h*. The wave forms shown in FIGURES 13*e* and 13*f* are rectangular wave output pulses of the flip-flop circuit 19 and, as illustrated, they are opposite in sense.

Figure 14:
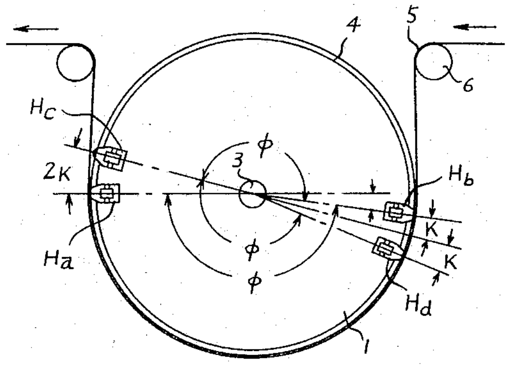
FIGURE 14 is a schematic diagram similar to FIGURES 1, 6 and 10 and illustrating still another example of a rotary magnetic head assembly for use with the present invention.
Figure 15:
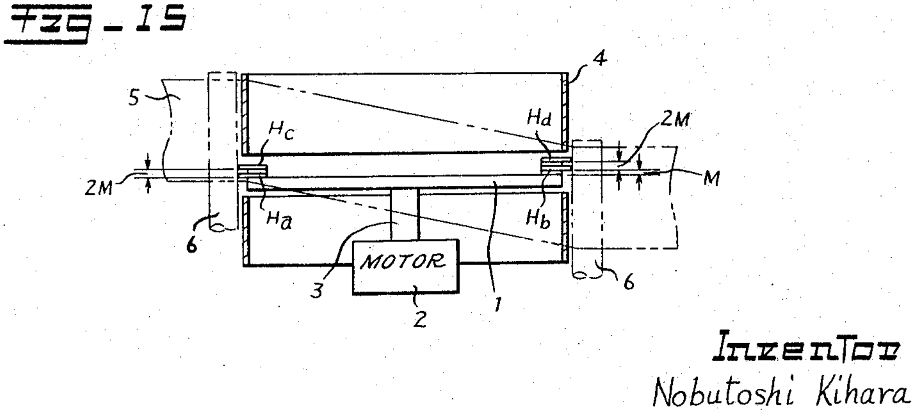
FIGURE 15 is a side view of the rotary magnetic head assembly illustrated in FIGURE 14.

The recording and reproducing apparatus described here and above has been described with reference to the recording and reproducing of black and white television signals. The invention will now be described in connection with the recording and/or reproducing of color television signals. One form of apparatus for accomplishing this is illustrated in FIGURES 14 and 15, wherein two pairs of magnetic heads H*a*–H*b* and H*c*–H*d* are illustrated. The two pairs of magnetic heads are required in order to divide the color video signals into a luminance signal and a chrominance signal, such, for example, as an $I+Q$ signal of the NTSC type color signal. These two signals are simultaneously recorded in the application of the present invention.

Figure 16:
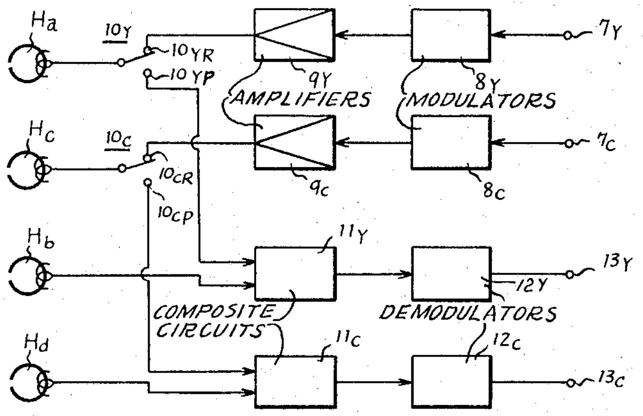
FIGURE 16 is a block diagram illustrating the electrical system for use with the rotary magnetic head assembly illustrated in FIGURES 14 and 15.

The operation of the apparatus illustrated in FIGURES 14 and 15 can best be described by reference to FIGURE 16. In FIGURE 16 a luminance signal (hereinafter referred to as a Y signal) is applied to the magnetic head H*a* through a terminal 7Y of a Y signal source, a modulator 8Y, an amplifier 9Y and the contact 10YR of a switch 10Y. The chrominance signal (hereinafter referred to as a C signal) is applied to the magnetic head H*c* through the terminal 7C of a C signal source, a modulator 8C, an amplifier 9C and the contact 10CR of a switch 10C. The reproduction of the recorded signals is carried out in the same manner as that explained in connection with FIGURE 4.

Figure 17:
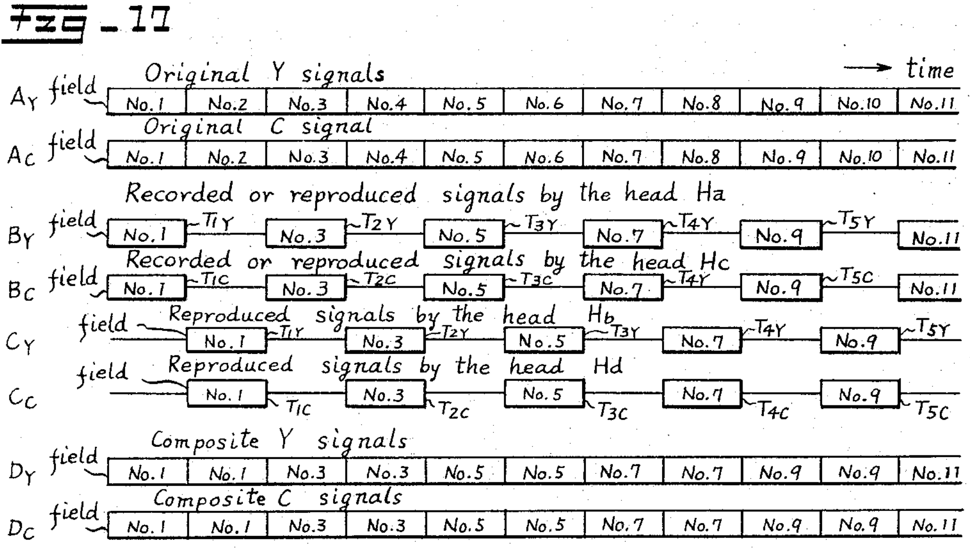
FIGURE 17 illustrates various video signal arrangements for explaining the operation of the system illustrated in FIGURE 16.

In FIGURES 17 AY and 17AC there are illustrated Y and C signals at every field or frame. The FIGURES 17BY and 17BC illustrate respectively the recorded and reproduced signals obtained by the heads H*a* and H*c*. During reproducing the signals reproduced by the heads H*b* and H*d* are identified in FIGURES 17CY and 17CC. As a result composite color video signals such as illustrated in FIGURES 17DY and 17DC are obtained at terminals 13Y and 13C respectively. A color picture can therefore be reproduced from the composite signals through the use of a matrix circuit in any well-known manner.

Figure 18:
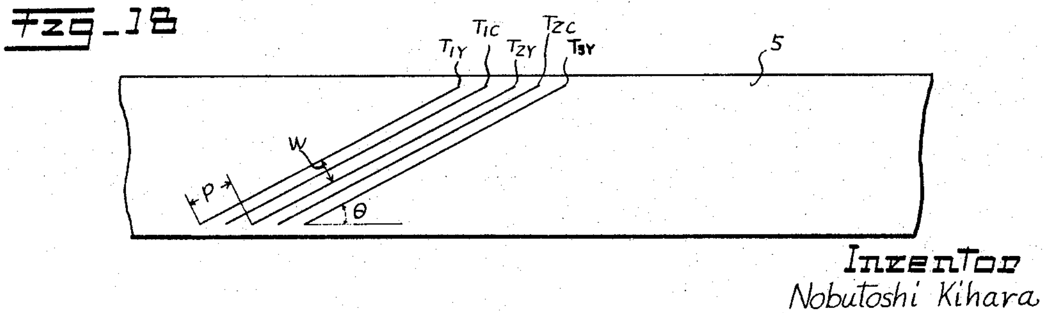
FIGURE 18 illustrates the tracks formed on a magnetic tape, the tracks being enlarged many times for the purpose of illustration.

In FIGURE 18 there are illustrated magnetic tracks formed on the tape 5 by use of the apparatus illustrated in FIGURES 14 and 15. The tracks $T_1Y$, $T_2Y$, etc., are scanned by the magnetic heads H*a* and H*b*, while the tracks $T_1C$, $T_2C$, etc., are scanned by the magnetic heads H*c* and H*d*.

In FIGURES 19 and 20 there is illustrated a modification of the rotary magnetic head assembly illustrated in FIGURES 14 and 15. As illustrated in FIGURES 19 and 20 the magnetic heads H*a* and H*b* are spaced apart a distance M in the axial direction and the other magnetic heads H*c* and H*d* are also disposed at the same rotary angular positions and similarly spaced a distance M in the axial direction. With the use of the apparatus illustrated in FIGURES 19 and 20 television signals can be recorded and are reproduced by the use of the circular arrangements illustrated in FIGURE 16.

While several embodiments of the invention have been illustrated and described it is to be understood that these were merely for the purpose of explanation. It will be apparent to those skilled in the art that many modifications and variations of the invention may be effected without departing from the scope of the novel concepts of the invention as set forth in the appended claims.

I claim:

1. Apparatus for recording and reproducing visual image signals, said apparatus comprising a plurality of heads, means for rotating said heads, a recording medium, guide means for guiding said recording medium past said heads whereby visual image signals are recorded on said recording medium, circuit means for activating less than said plurality of heads during recording of said visual image signals whereby less than all of said visual image signals are recorded, and means for scanning all of said recorded signals on said recording medium with all of said plurality of heads during reproduction whereby a visual image signal is reproduced identical in duration to said visual image signals prior to recording.

2. Apparatus for recording and reproducing only specified portions of visual image signals whereby the quantity of magnetic tape necessary to record said signals is reduced by the portion of said signals not recorded, said apparatus comprising a plurality of magnetic heads, means for rotating said heads, magnetic tape, means for guiding said tape past said heads whereby visual image signals are recorded on said tape, circuit means for activating less than said plurality of heads during recording of said visual image signals whereby less than all of said visual image signals are recorded, and means for scanning all of said recorded signals on said tape with all of said plurality of heads during reproduction whereby a visual image signal is reproduced identical in duration to said visual image signals prior to recording.

3. Apparatus for recording and reproducing visual image signals whereby only predetermined portions of said signals are recorded and each of said recorded signals is reproduced a plurality of times during reproduction such that said reproduced signals are equal in duration to said original signals prior to recording, said apparatus comprising a plurality of magnetic heads, means for rotating said heads, magnetic tape, guide means for guiding said tape past said heads whereby visual image signals are recorded on said tape in the form of tracks, circuit means for activating less than said plurality of heads during recoridng of said visual image signals whereby less than all of said visual image signals are recorded, and means for scanning each of said tracks on said tape with all of said plurality of heads during reproduction whereby a visual image signal is reproduced identical in duration to said visual image signals prior to recording.

4. Apparatus for recording and reproducing only specified portions of visual image signals whereby the quantity of magnetic tape necessary to record said signals is reduced by the portion of said signals not recorded, said apparatus comprising at least two magnetic heads, means for rotating said heads, magnetic tape, means for guiding said tape past said heads whereby visual image signal frames are recorded on said tape in the form of tracks, circuit means for activating only one of said heads during recording whereby only alternate frames of said signal are recorded, and both of said heads scanning each of said tracks on said tape during reproduction whereby each of said signal frames is reproduced twice to produce a visual image signal identical in duration to said visual image signal prior to recording.

5. Apparatus for recording and reproducing only specified portions of visual image signals whereby the quantity of magnetic tape necessary to record said signals is reduced by the portion of said signals not recorded, said apparatus comprising at least two magnetic heads, means for rotating said heads, magnetic tape, means for guiding said tape past said heads whereby visual image signal frames are recorded on said tape in the form of parallel tracks oblique to the direction of travel of said tape, circuit means for activating only one of said heads during recording whereby only alternate frames of said signal are recorded, and both of said heads scanning each of said tracks on said tape during reproduction whereby each of said signal frames is reproduced twice to produce a visual image signal identical in duration to said visual image signal prior to recording.

6. Apparatus in accordance with claim 5 wherein said magnetic heads are spaced apart an angular distance of slightly less than 180° and the magnetic tape passes over approximately 180° of the surface of said tape guide means.

7. Apparatus in accordance with claim 6 wherein said magnetic heads are spaced apart a small distance in the axial direction.

8. Apparatus in accordance with claim 5 wherein said magnetic heads are spaced apart a small angular distance, and the magnetic tape passes over approximately 360° of the surface of said tape guide means.

9. Apparatus in accordance with claim 8 wherein said magnetic heads are spaced apart a small distance in the axial direction.

10. Apparatus for recording and reproducing color video signals whereby only predetermined portions of said signals are recorded and each of said recorded signals is reproduced a plurality of times during reproduction such that said reproduced signals are equal in duration to said original signals prior to recording, said apparatus comprising means for separating said color signals into luminance signals and chrominance signals, first and second sets of magnetic recording heads, each set having at least two heads, means for rotating said heads, magnetic tape, means for guiding said tape past said heads whereby video signal frames are recorded on said tape in the form of parallel tracks oblique to the direction of travel of said tape, said luminance signals being applied to said first set of heads and said chrominance signals being applied to said second set of heads, circuit means for activating only one of said heads of each set during recording whereby only alternate frames of each of said luminance and chrominance signals is recorded, and both of said heads of each set scanning each of said tracks on said tape during reproduction whereby each of said signal frames is reproduced twice to produce a visual image signal identical in duration to said visual image signal prior to recording, and means for combining said reproduced luminance and chrominance signals to produce a color picture.

11. A method for recording and reproducing visual image signals, said method comprising the steps of guiding a recording medium past a plurality of spaced rotating heads whereby visual image signals are recorded on said recording medium, activating less than all of said plurality of heads during recording whereby less than all of said visual image signals are recorded, and scanning all of said recorded signals with all of said plurality of heads during reproduction whereby a visual image signal is reproduced identical in duration to said visual image signals prior to recording.

12. A method for recording and reproducing visual image signals whereby only predetermined portions of said signals are recorded and each of said recorded signals is reproduced a plurality of times during reproduction such that said reproduced signals are equal in duration to said original signals prior to recording, said method comprising the steps of guiding a magnetic tape past a plurality of spaced rotating magnetic heads whereby visual image signals in the form of tracks are recorded on said tape, activating less than all of said plurality of heads during recording whereby less than all of said visual image signals are recorded, and scanning all of said recorded tracks with all of said plurality of heads during reproduction whereby a visual image signal is reproduced identical in duration to said visual image signals prior to recording.

References Cited

UNITED STATES PATENTS

| | | | |
|---|---|---|---|
| 2,969,425 | 1/1961 | Hughes | 178—5.4 |
| 2,995,620 | 8/1961 | Burr | 178—5.4 |
| 3,157,739 | 11/1964 | Okamura | 178—6.6 |
| 3,188,385 | 6/1965 | Kihara | 178—6.6 |
| 3,255,303 | 6/1966 | Kihara | 178—5.4 |
| 3,267,207 | 8/1966 | Okazaki et al. | 178—5.2 |

JOHN W. CALDWELL, *Primary Examiner.*

J. A. O'BRIEN, *Assistant Examiner.*